(12) United States Patent
Nakagawa

(10) Patent No.: US 6,707,645 B2
(45) Date of Patent: Mar. 16, 2004

(54) MICROACTUATOR-MOUNTED MAGNETIC HEAD DEVICE WITH CONTROL CONDUCTIVE PATTERN

(75) Inventor: Masayoshi Nakagawa, Niigata-ken (JP)

(73) Assignee: Alps Electric Co., Ltd. (JP)

(*) Notice: Subject to any disclaimer, the term of this patent is extended or adjusted under 35 U.S.C. 154(b) by 223 days.

(21) Appl. No.: 09/943,831

(22) Filed: Aug. 30, 2001

(65) Prior Publication Data

US 2002/0006016 A1 Jan. 17, 2002

(30) Foreign Application Priority Data

Sep. 4, 2000 (JP) .................................. 2000-267274

(51) Int. Cl.[7] .............................................. G11B 5/56
(52) U.S. Cl. .................................................. 360/294.4
(58) Field of Search .......................... 360/294.4, 244.1, 360/245.9, 323; 361/685

(56) References Cited

U.S. PATENT DOCUMENTS

| | | | |
|---|---|---|---|
| 5,898,544 A | 4/1999 | Krinke et al. ............ 360/264.5 |
| 5,973,882 A | 10/1999 | Tangren | |
| 6,025,988 A * | 2/2000 | Yan .............................. 361/685 |
| 6,163,443 A * | 12/2000 | Hatagami et al. ........... 360/323 |
| 6,327,120 B1 * | 12/2001 | Koganezawa et al. ... 360/294.4 |
| 6,351,347 B1 * | 2/2002 | Ohno et al. ............... 360/244.1 |
| 6,477,014 B1 * | 11/2002 | Erpelding ................ 360/245.9 |
| 6,480,359 B1 * | 11/2002 | Dunn et al. .............. 360/245.9 |
| 6,532,138 B1 * | 3/2003 | Koganezawa ............ 360/294.4 |

* cited by examiner

*Primary Examiner*—Tianjie Chen
(74) *Attorney, Agent, or Firm*—Brinks Hofer Gilson & Lione (57) ABSTRACT

In a magnetic head device, recording conductive patterns are formed between a control conductive pattern and reproducing conductive patterns. Accordingly, the capacitive coupling between the control conductive pattern, in which surge current flows, and the recording conductive patterns decreases. This can prevent a current from flowing in the reproducing conductive patterns and can reduce damage to a reproducing device having a low current durability.

9 Claims, 6 Drawing Sheets

MICROACTUATOR-MOUNTED MAGNETIC HEAD DEVICE WITH CONTROL CONDUCTIVE PATTERN

BACKGROUND OF THE INVENTION

1. Field of the Invention

The present invention relates to a magnetic head device that includes a reproducing device with a magneto-resistive (MR) head, and in which a piezoelectric element is provided on a supporting member for supporting the MR head, and in particular, to a magnetic head device that prevents the MR head from being broken.

2. Description of the Related Art

Figure 5:
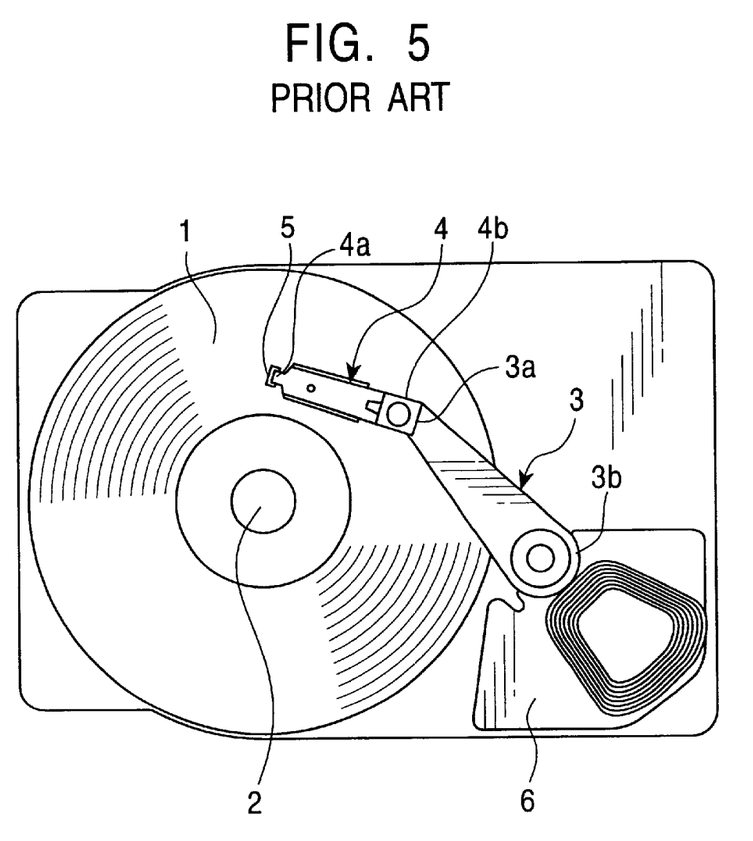
FIG. 5 is a plan view showing a conventional hard disk drive.

FIG. 5 is a plan view of a conventional hard disk drive. A magnetic disk 1 is rotated by a spindle motor 2.

A load beam 4 is joined to an end portion 3a of a carriage having stiffness, and an end portion 4a of the load beam has a slider 5 provided with a flexure (not shown).

The load beam 4 is made of flat spring material. The load beam 4 has a base portion 4b that is fixed to the carriage 3. The end portion 4a of the load beam 4 supports the slider 5.

The slider 5 is provided with a reproducing device that uses magnetically resistive effects to detect a magnetic signal recorded on a magnetic disk 1, and with a recording device that records a magnetic signal on the magnetic disk 1. Airflow, caused by the rotation of the magnetic disk 1, floats the slider 5 above the magnetic disk 1. Recording and reproduction are performed in this floating state.

The carriage 3 has a base portion 3b provided with a voice coil motor 6. The voice coil motor 6 drives the carriage 3 and the load beam 4 in the radial direction of the magnetic disk 1, whereby a seek operation is performed to move the reproducing device and the recording device of the slider 5 onto an arbitrary recording track, and a tracking operation is performed to maintain the reproducing device and the recording device on the central line of the recording track.

As the recording density of the magnetic disk 1 is increased, the precision of the tracking operation must also be increased. Conventionally, the seek operation and the tracking operation are performed such that the voice coil motor 6 only drives the carriage 3.

To increase the precision of the tracking operation, the servo band of a servo system including the voice coil motor 6 must be increased. However, the servo band is limited by a point of mechanical resonance between the carriage 3 and a bearing (not shown) that rotatably supports the carriage 3. The mechanical resonant point of the carriage is determined by the size of the carriage 3, and the size of the carriage 3 is determined by the standard-based diameter of the magnetic disk 1. For example, when the magnetic disk 1 has a diameter of 3.5 inches, the point of resonance between the carriage 3 and the bearing is approximately 3.5 kHz.

When the point of resonance between the carriage 3 and the bearing is approximately 3.5 kHz, then the upper limit of the servo band of the servo system which allows the tracking operation by only driving the carriage 3 by the voice coil motor 6 is approximately 700 Hz.

Accordingly, a method has recently been proposed in which a tracking operation is performed by using a micromotion actuator provided on a load beam to move only an end portion of the load beam.

Figure 6:
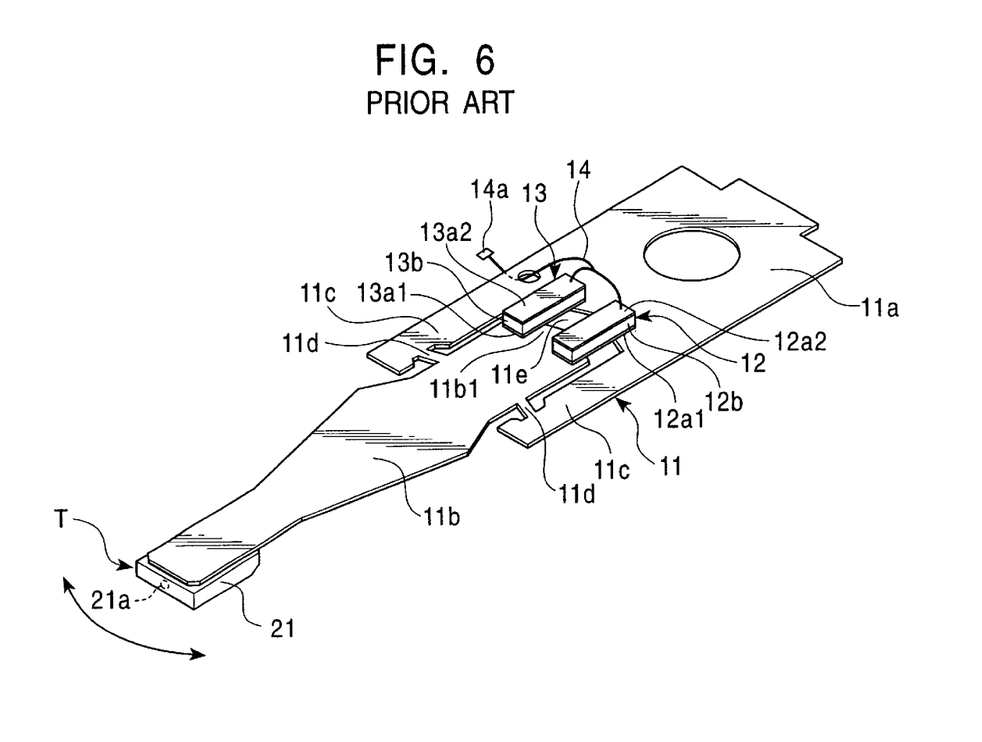
FIG. 6 is a perspective view showing a conventional load beam with piezoelectric elements.

FIG. 6 is a perspective view of a load beam 11 provided with a piezoelectric element as a micromotion actuator. The load beam 11 is made of a flat-spring stainless-steel material and has a fixed base portion 11a held by a carriage and a moving portion 11b that can be horizontally moved with respect to the fixed base portion 11a. On both sides of a front end portion of the fixed base portion 11a, arm portions 11c extending in the longitudinal direction of the fixed base portion 11a are formed. The moving portion 11b is joined to the arm portions 11c by elastic supporting portions 11d.

Piezoelectric elements 12 and 13 are provided on the moving portion 11b and the fixed base portion 11a across a gap portion 11e. The piezoelectric elements 12 and 13 are configured such that electrode layers 12a1 and 12a2 are respectively formed on the lower and upper surfaces of a piezoelectric element layer 12b, and electrode layers 13a1 and 13a2 are respectively formed on the lower and upper surfaces of a piezoelectric element layer 13b.

The load beam 11 in FIG. 6 is connected to a ground (not shown). The electrode layers 12a1 and 13a1 of the piezoelectric elements 12 and 13 are electrically connected to the load beam 11, and are thereby connected to the ground. Each of the piezoelectric layers 12b and 13b of the piezoelectric elements 12 and 13 is polarized in the direction of the layer thickness. The piezoelectric elements 12 and 13 have reverse polarization directions. Therefore, when the same potential is applied to the electrode layers 12a2 and 13a2, one piezoelectric element extends longitudinally, while the other piezoelectric element contracts longitudinally.

As a result, the elastic supporting portions 11d warp to change the posture of a slider 21 provided on an end portion of the moving portion 11b. In other words, by moving the slider 21 in a track-width direction, a tracking operation can be performed. By using a piezoelectric-element-mounted load beam to form a servo system, the servo band can be set to 2 kHz or greater.

The piezoelectric elements 12 and 13 are warped when a voltage is applied through conductor 14 to the electrode layers 12a1, 12a2, 13a1, and 13a2. Conversely, when the piezoelectric elements 12 and 13 are warped due to stress, a voltage is generated between the electrode layers 12a1 and 12a2 and a voltage is generated between the electrode layers 13a1 and 13a2.

In particular, when touching some conductor, surge current may flow in the piezoelectric elements 12 and 13 because, in the process for ultrasonically cleaning or carrying the magnetic head device, large vibrations may act on the piezoelectric elements 12 and 13. The surge current may reach a frequency of several hundred to several thousand megahertz and a magnitude of several amperes. This high frequency current causes an adjacent conductive pattern to generate an induced current. Also, a change in the voltage of the high frequency causes capacitive coupling with the conductive pattern, so that the current is transferred. In particular, when the magnetic head device is cleaned, current transfer occurs due to capacitive coupling caused by water having a dielectric constant several ten times that of air.

In particular, the reproducing device is often broken by the above current in the supersonic cleaning or carrying process since it has low durability against the above current.

SUMMARY OF THE INVENTION

Accordingly, it is an object of the present invention to provide a magnetic head device that reduces damage to a reproducing device and a recording device in a structure having a recording conductive pattern for transmitting a recording signal, and which comprises a control conductive pattern that supplies a control signal to a piezoelectric element connected thereto, and a reproducing conductive pattern that transmits a signal obtained by reproduction.

To this end, and according to the present invention, there is provided a magnetic head device including a slider provided with a reproducing device for using magnetoresistance to detect a magnetic signal recorded on a recording medium, and a recording device for recording a magnetic signal on the recording medium, a wiring member having a reproducing conductive pattern connected to the reproducing device and a recording conductive pattern connected to the recording device, and an elastic supporting member for supporting the slider and the wiring member. A piezoelectric element for changing the posture of the slider by warping the elastic supporting member is provided on the elastic supporting member, and the recording conductive pattern is formed between the reproducing conductive pattern and a control conductive pattern that is formed on the wiring member and which supplies a control signal to the piezoelectric element connected thereto.

Preferably, pads are formed at ends of the reproducing pattern and the recording conductive pattern that are opposite to the other ends respectively connected to the reproducing device and the recording device, and a pad is formed at one end of the control conductive pattern that is opposite to the other end connected to the piezoelectric element.

The elastic supporting member may be connected to the ground by a conductive material, and the ground terminal of the piezoelectric element may be connected to the ground by the elastic supporting member.

The control conductive pattern may include a grounding pattern to which the ground terminal of the piezoelectric element is connected and a control signal pattern that is connected to a terminal other than the ground terminal of the piezoelectric element and which supplies a control signal.

Among the pads formed at the ends of the reproducing conductive pattern, the recording conductive pattern, and the control conductive pattern, the pad formed at the end of the control conductive pattern may be closest in position to the piezoelectric element.

According to the present invention, a recording conductive pattern is formed between a control conductive pattern and a reproducing conductive pattern. This can reduce the capacitance between the control conductive pattern and the reproducing conductive pattern.

Accordingly, in a process for ultrasonically cleaning or carrying a magnetic head device, when a surge current flows from a piezoelectric element to the control conductive pattern, the capacitive coupling between the control conductive pattern and the reproducing conductive pattern can be reduced, whereby the flow of a current in the reproducing conductive pattern can be prevented and damage to a reproducing device having low durability can be reduced.

DESCRIPTION OF THE PREFERRED EMBODIMENTS

Figure 1:
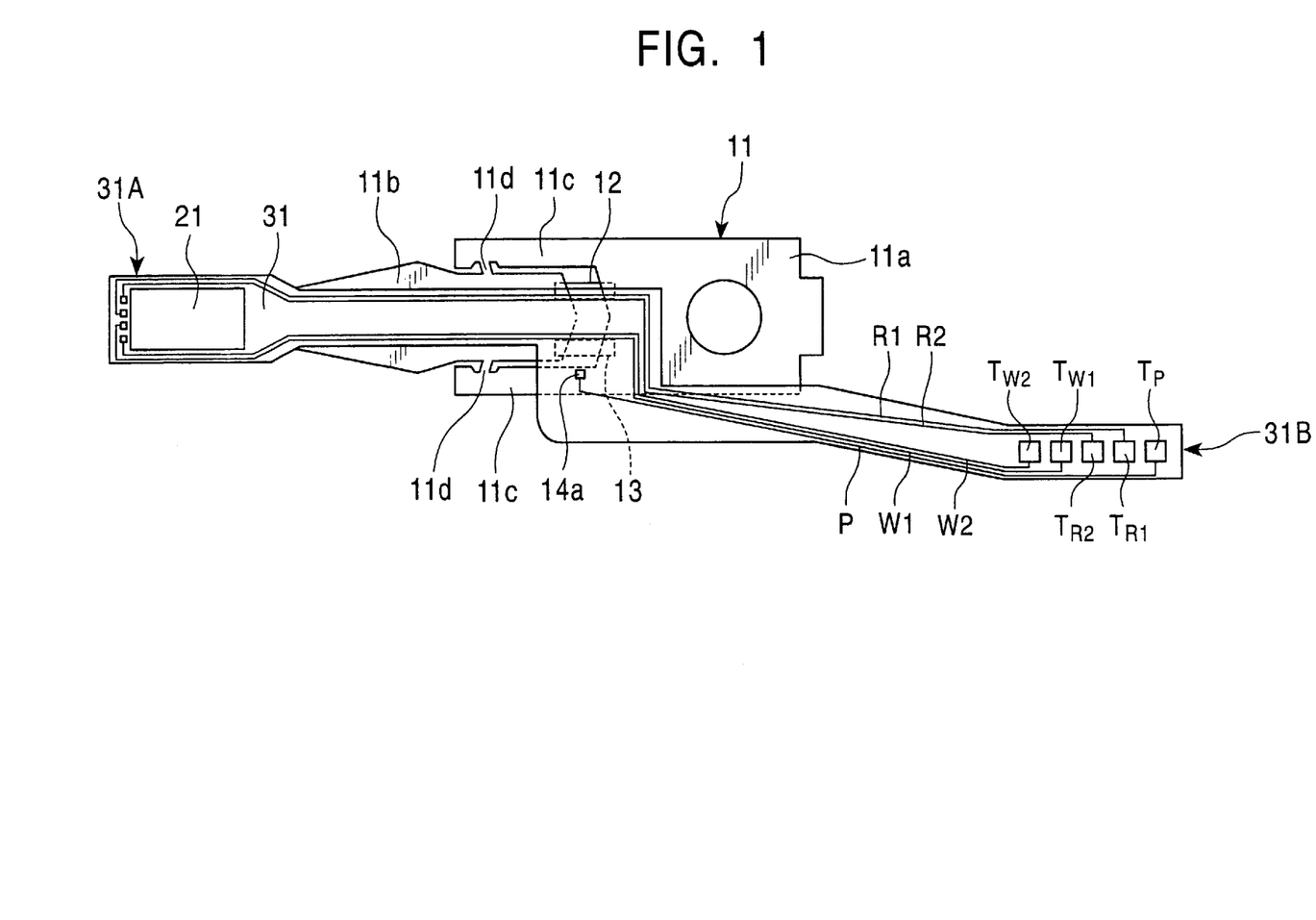
FIG. 1 is a plan view showing a magnetic head device according to a first embodiment of the present invention.

A magnetic head device in FIG. 1 has, on a side of a load beam 11 which opposes a recording medium, a wiring member 31 having reproducing conductive patterns R1 and R2 and recording conductive patterns W1 and W2. The wiring member 31 is such that on a thin flat spring made of stainless steel or the like, the reproducing conductive patterns R1 and R2 and the recording conductive patterns W1 and W2, which are made of a conductive material such as copper, are formed on an insulating layer made of an insulating material such as polyimide. At an end 31A of the wiring member 31, a slider 21 is provided having a reproducing device that uses a magnetoresistance to detect a magnetic signal recorded on the recording medium and a recording device that records a magnetic signal on the recording medium. The end 31A of the wiring member 31 also functions as a flexure.

The load beam 11 is an elastic supporting member for supporting the slider 21 and the wiring member 31, and is provided with piezoelectric elements similar to those used on the load beam shown in FIG. 6.

Similarly to the load beam 11 in FIG. 6, the load beam 11 in FIG. 1 is made of flat stainless-steel spring, and has a fixed base portion 11a held by a carriage and a horizontally movable portion 11b. On both sides of a front end of the fixed base portion 11a, arm portions 11c extending in the longitudinal direction of the fixed base portion 11a are formed. The moving portion 11b is joined to the arm portions 11c by elastic supporting portions 11d.

Above the moving portion 11b and the fixed base portion 11a (i.e., on the side of the load beam 11 that is opposite to the side on which wiring member 31 is formed), piezoelectric elements 12 and 13 are provided across a gap portion 11e. The piezoelectric elements 12 and 13 are configured as shown in FIG. 6 such that electrode layers 12a1 and 12a2 are respectively formed on the lower and upper surfaces of a piezoelectric element layer 12b, and electrode layers 13a1 and 13a2 are respectively formed on the lower and upper surfaces of a piezoelectric element layer 13b.

Similarly to the load beam 11 in FIG. 6, the load beam 11 in FIG. 1 is connected to a ground. The electrode layers 12a1 and 13a1 of the piezoelectric elements 12 and 13 are electrically connected to the load beam 11, thereby also being connected to the ground. A gold wire 14 is connected to the electrode layers 12a2 and 13a2, and is connected at a terminal 14a to a control conductive pattern P provided on the wiring member 31 (in FIG. 1).

The piezoelectric layers 12b and 13b of the piezoelectric elements 12 and 13 are polarized in the direction of the layer thickness. The piezoelectric elements 12 and 13 have reverse polarization directions. Accordingly, when the same potential is applied to the electrode layers 12a2 and 13a2 via the gold wire 14, one piezoelectric element extends longitudinally, while the other piezoelectric element contracts longitudinally.

As a result, the elastic supporting portions 11d warp to change the posture of a slider 21 provided on an end portion of the moving portion 11b. In other words, by moving the slider 21 in a track-width direction, a tracking operation can be performed. By using a piezoelectric-element-mounted load beam to form a servo system, the servo band can be set to 2 kHz or greater.

The load beam 11 is supported by a carriage 3 as a stiffness supporting member in a hard disk drive as shown in, for example, FIG. 7.

The slider 21 is made of ceramic material and has, on a trailing-side T face of the slider 21, a thin film device 21a identical to the slider 21 in FIG. 6. On a side of the slider 21 which opposes the recording medium, an air bearing surface (floating surface) is formed.

The thin film device 21a is a so-called "combined thin film device" including both a reproducing device (MR head) that reads a magnetic recording signal recorded on the recording medium and a recording device (inductive head) that records a magnetic signal on the recording medium. The reproducing head includes a magnetoresistance device that uses a magnetoresistance typifying spin-valve layer, and a shield layer made of magnetic material. The recording device includes a core made of magnetic material and a coil in the form of a pattern.

The reproducing conductive patterns R1 and R2, and the recording conductive patterns W1 and W2, which are provided on the wiring member 31, are each connected to the reproducing device and the recording device on the side of the end portion 31A, and are each connected to pads $T_{R1}$, $T_{R2}$, $T_{w1}$, and $T_{w2}$ on the side of the base portion 31B. The control conductive pattern P, which supplies a control signal to the piezoelectric elements 12 and 13, is connected to the piezoelectric elements 12 and 13 at the terminal 14a, and is connected to a pad $T_P$ on the side of the base portion 31B.

In the first embodiment, the control conductive pattern P, which is connected to the piezoelectric elements 12 and 13, and which controls the control signal, and the reproducing conductive patterns R1 and R2 are disposed along opposite edges of the wiring member 31, with the recording conductive patterns W1 and W2 provided therebetween. At the base portion 31B of the wiring member 31, the control conductive pattern P and the reproducing conductive patterns R1 and R2 are disposed in opposite directions, with the pads $T_{R1}$, $T_{R2}$, $T_{w1}$, $T_{w2}$, and $T_P$ provided between the control conductive pattern P and the reproducing conductive patterns R1 and R2.

The piezoelectric elements 12 and 13 are warped when a voltage is applied to the electrode layers 12a1 and 12a2, and to the electrode layers 13a1 and 13a2. Conversely, when stress is applied to the piezoelectric elements 12 and 13, and the piezoelectric elements 12 and 13 warp, a voltage is generated between the electrode layers 12a1 and 12a2, and a voltage is also generated between the electrode layers 13a1 and 13a2.

In particular, because large vibrations may act on the piezoelectric elements 12 and 13 during an ultrasonically cleaning process or during the carrying of the magnetic head device, the piezoelectric elements 12 and 13 may have very high voltages, and a current may flow in the reproducing device and the recording device. In many cases, the reproducing device is broken by the current from the ultrasonically cleaning process or from carrying the magnetic head device because the reproducing device has a low durability against such a current.

Concerning the wiring member 31 in the first embodiment, all the surfaces of the control conductive pattern P, the reproducing conductive patterns R1 and R2, and the recording conductive patterns W1 and W2 are not covered with an insulating layer. Thus, when they are immersed in water, a high frequency current can easily flow.

However, in the first embodiment, the recording conductive patterns W1 and W2 formed between the control conductive pattern P and the reproducing conductive patterns R1 and R2 can reduce the coupling capacitance between the control conductive pattern P and the reproducing conductive patterns R1 and R2.

Accordingly, the coupling between the control conductive pattern P, in which surge current flows, and the reproducing conductive patterns R1 and R2 decreases, whereby a current is prevented from flowing between the reproducing conductive patterns R1 and R2, and damage to the reproducing device having low durability can be reduced.

Figure 2:
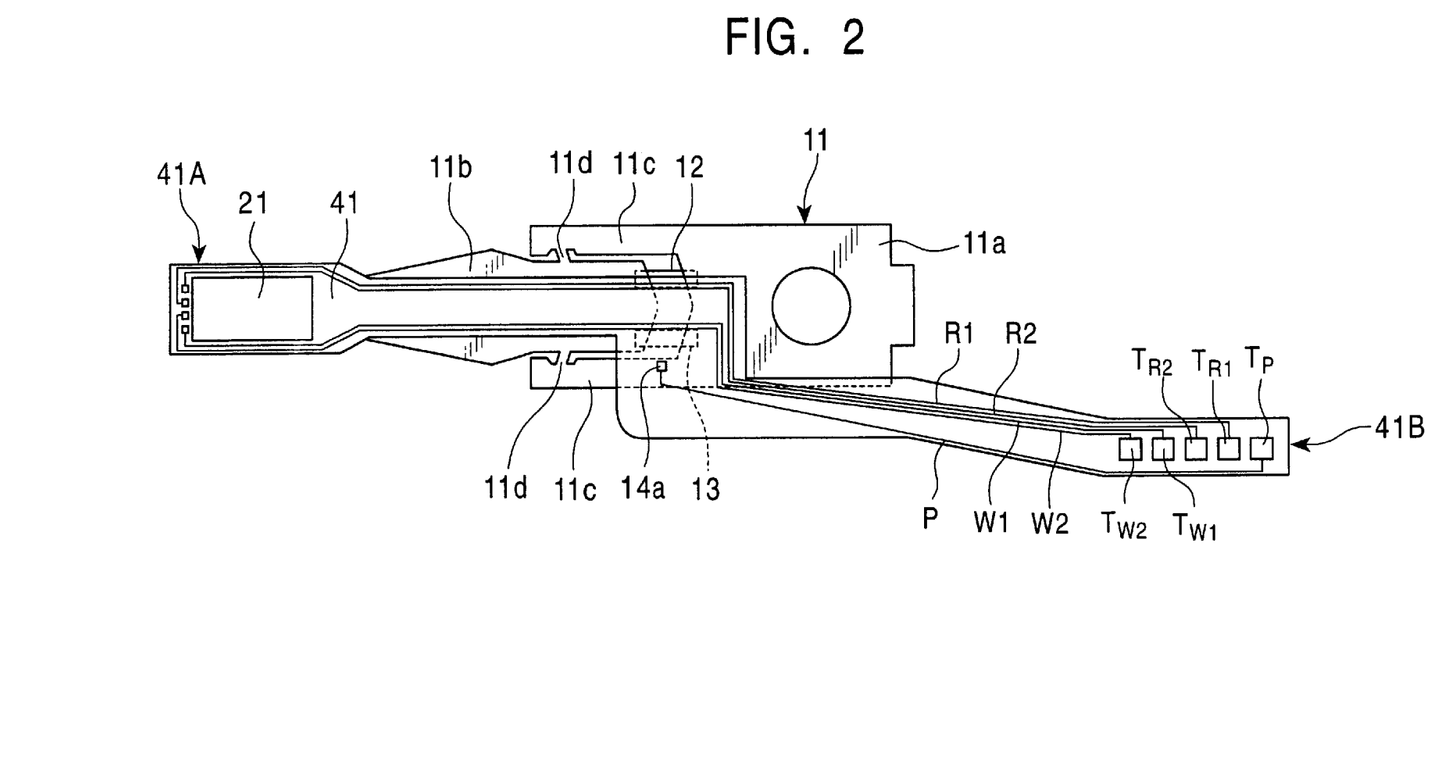
FIG. 2 is a plan view showing a magnetic head device according to a second embodiment of the present invention.

FIG. 2 is a plan view showing a magnetic head device according to a second embodiment of the present invention.

In the second embodiment, a control conductive pattern P, which is connected to piezoelectric elements 12 and 13, and which controls a control signal, and reproducing conductive patterns R1 and R2 are disposed along opposite edges of a wiring member 41, with recording conductive patterns W1 and W2 provided between the control conductive pattern P and the reproducing conductive patterns R1 and R2. On the side of a base portion 41B of the wiring member 41, the control conductive pattern P, the reproducing conductive patterns R1 and R2, and the recording conductive patterns W1 and W2 are disposed in opposite directions on the wiring member 41, with pads $T_{R1}$, $T_{R2}$, $T_{w1}$, $T_{w2}$, and $T_P$ provided between the control conductive pattern P and the reproducing and recording patterns.

Also, in the second embodiment, the coupling between the control conductive pattern P, in which surge current flows, and the reproducing conductive patterns R1 and R2 decreases, whereby a current is prevented from flowing between the reproducing conductive patterns R1 and R2, and damage to the reproducing device having low durability can be reduced.

Figure 3:
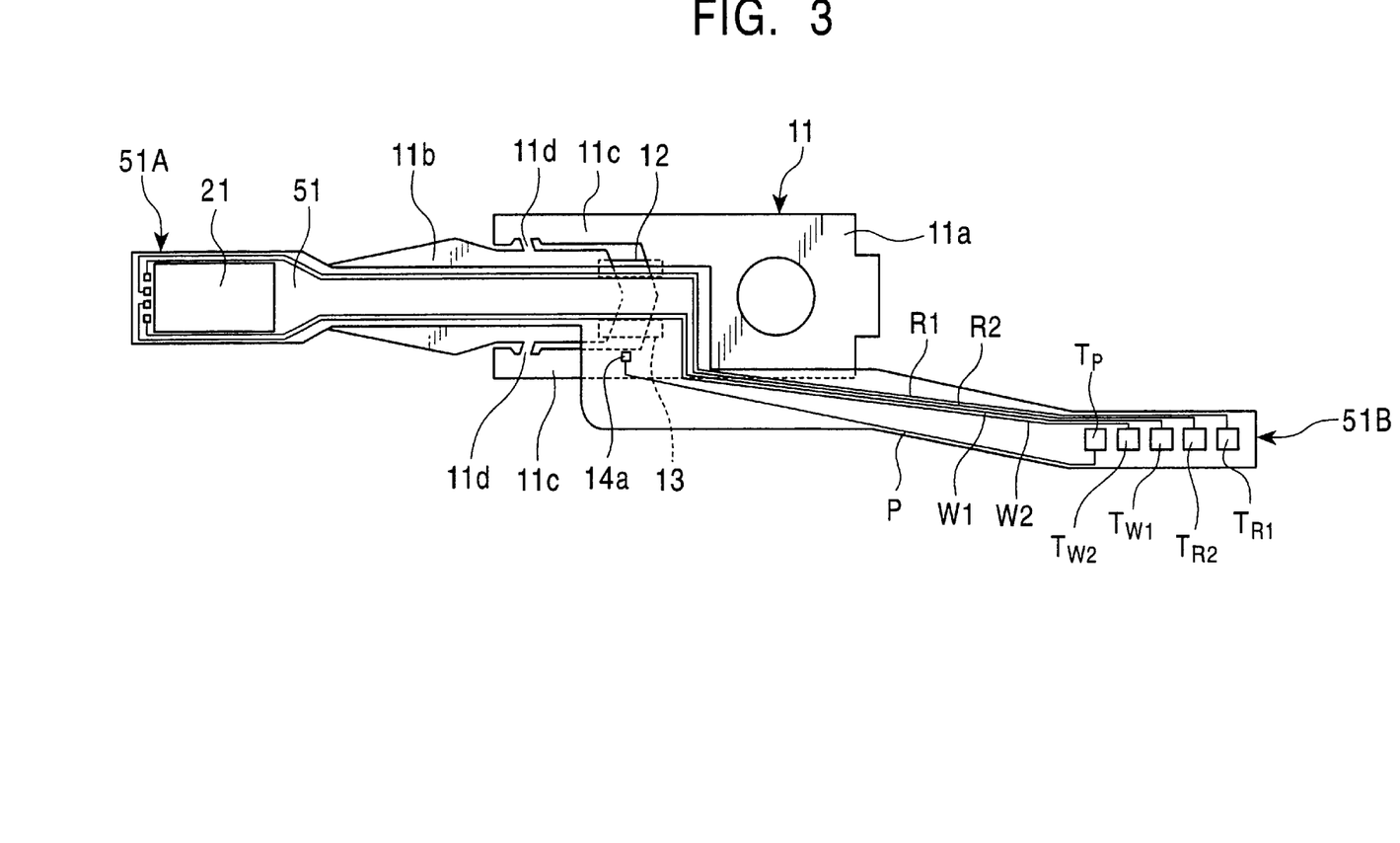
FIG. 3 is a plan view showing a magnetic head device according to a third embodiment of the present invention.

FIG. 3 is a plan view showing a magnetic head device according to a third embodiment of the present invention.

In the third embodiment, a control conductive pattern P, which is connected to piezoelectric elements 12 and 13, and which controls a control signal, and reproducing conductive patterns R1 and R2 are disposed along opposite edges of a wiring member 51, with recording conductive patterns W1 and W2 provided between the control conductive pattern P and the reproducing conductive patterns R1 and R2. On the side of a base portion 51B of the wiring member 51, the control conductive pattern P, and the reproducing conductive patterns R1 and R2, and the recording conductive patterns W1 and W2 are disposed in opposite directions on the wiring member 51, with pads $T_{R1}$, $T_{R2}$, $T_{w1}$, $T_{w2}$, and $T_P$ provided between the control conductive pattern P and the reproducing and recording patterns.

In FIG. 3, among pads $T_{R1}$, $T_{R2}$, $T_{w1}$, $T_{w2}$, and $T_P$ formed at ends of the reproducing conductive patterns R1 and R2, recording conductive patterns W1 and W2, and the control conductive pattern P, the pad $T_P$ is formed closest to the piezoelectric elements 12 and 13. Accordingly, the capacitive coupling between the control conductive pattern P and the reproducing conductive patterns R1 and R2 can be reduced more than in each of the magnetic head devices shown in FIGS. 1 and 2, and damage to the reproducing device having low durability can be reduced.

Figure 4:
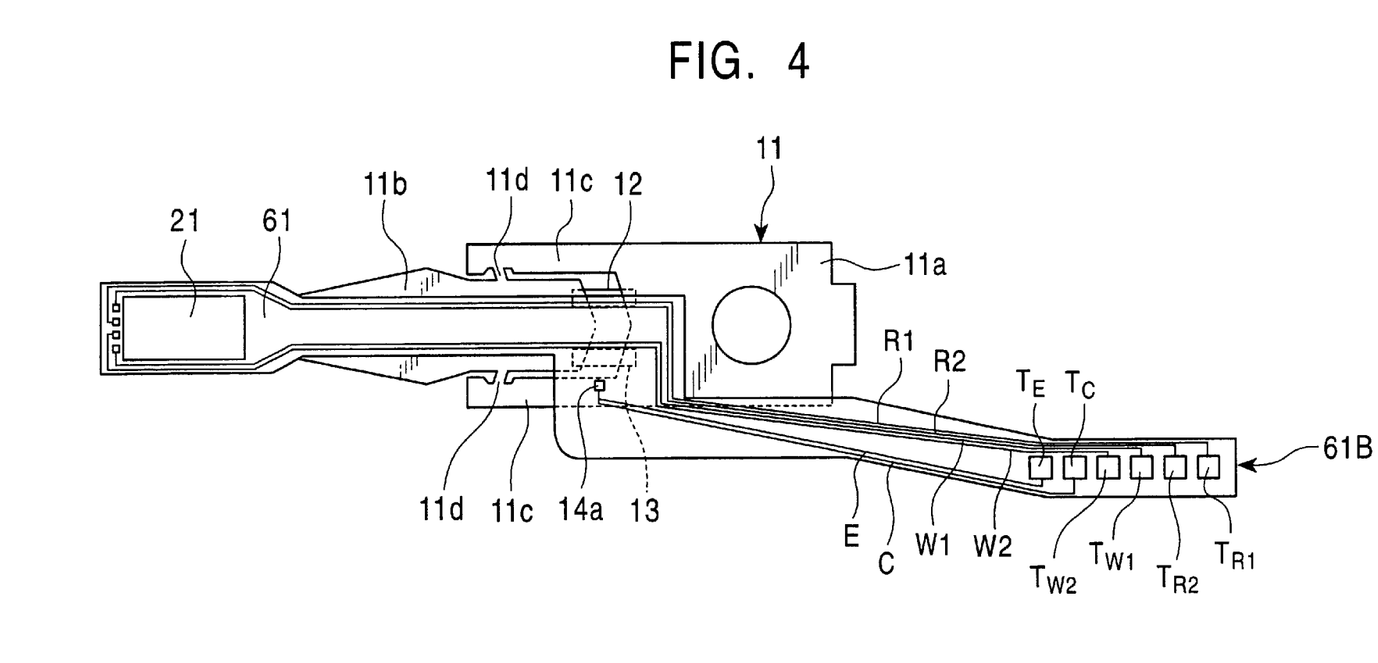
FIG. 4 is a plan view showing a magnetic head device according to a fourth embodiment of the present invention.

FIG. 4 is a plan view showing a magnetic head device according to a fourth embodiment of the present invention.

In the fourth embodiment, a grounding pattern E, to which the ground terminals of piezoelectric elements 12 and 13 (similar to the electrode layers 12a1 and 13a1 shown in FIG. 6) are connected by a terminal (not shown), and a control signal pattern C, to which terminals (similar to the electrode layers 12a2 and 13a2 shown in FIG. 6) other than the ground terminals of the piezoelectric elements 12 and 13 are connected by a ground terminal 14a, are formed as control conductive patterns provided on a wiring member 61. The ground pattern E is connected to the ground. The control signal pattern C is used to supply a control signal to the piezoelectric elements 12 and 13.

On the side of a base portion 61B of the wiring member 61, on which the ground pattern E and the control signal pattern C are formed, pads $T_E$ and $T_C$ are formed.

Also, in the fourth embodiment, the grounding pattern E and the control signal pattern C, which are control conductive patterns for supplying a control signal to the piezoelectric elements 12 and 13, and reproducing conductive patterns R1 and R2 are disposed along opposite edges of the wiring member 61, with recording conductive patterns W1 and W2 provided therebetween.

On the side of a base portion 61B of the wiring member 61, a group of the grounding pattern E and the control signal pattern C, a group of the reproducing conductive patterns R1 and R2, and the recording conductive patterns W1 and W2 are disposed in opposite directions, with pads $T_{R1}$, $T_{R2}$, $T_{w1}$, $T_{w2}$, $T_E$, and $T_C$ provided between the groups.

In the fourth embodiment, the capacitive coupling between the grounding pattern E and the control signal pattern C, in which surge current flows, and the reproducing conductive patterns R1 and R2 decreases, whereby a current is prevented from flowing between the reproducing conductive patterns R1 and R2, and damage to a reproducing device having low durability can be reduced.

What is claimed is:

1. A magnetic head device comprising:
   a slider provided with a reproducing device for using magnetoresistance to detect a magnetic signal recorded on a recording medium and a recording device for recording a magnetic signal on said recording medium;
   a wiring member having a reproducing conductive pattern connected to said reproducing device and a recording conductive pattern connected to said recording device;
   an elastic supporting member for supporting said slider and said wiring member; and
   a piezoelectric element provided on said elastic supporting member, said piezoelectric element changing the posture of said slider by warping said elastic supporting member,
   wherein said recording conductive pattern is formed between said reproducing conductive pattern and a control conductive pattern that is formed on said wiring member and which supplies a control signal to said piezoelectric element connected thereto.

2. A magnetic head device according to claim 1, wherein pads are formed at first ends of said reproducing conductive pattern and said recording conductive pattern which are opposite to second ends respectively connected to said reproducing device and said recording device, and a pad is formed at a first end of said control conductive pattern which is opposite to a second end connected to said piezoelectric element.

3. A magnetic head device according to claim 2, wherein said elastic supporting member is made of a conductive material and is connected to a ground, and a ground terminal of said piezoelectric element is connected to the ground by said elastic supporting member.

4. A magnetic head device according to claim 2, wherein said control conductive pattern includes a grounding pattern to which a ground terminal of said piezoelectric element is connected and a control signal pattern which is connected to a terminal other than the ground terminal of said piezoelectric element and which supplies a control signal.

5. A magnetic head device according to claim 2, wherein among the pads formed at the first ends of said reproducing conductive pattern, said recording conductive pattern, and said control conductive pattern, the pad formed at the first end of said control conductive pattern is closest in position to said piezoelectric element.

6. A magnetic head device according to claim 5, wherein said elastic supporting member is made of a conductive material and is connected to the ground, and the ground terminal of said piezoelectric element is connected to the ground by said elastic supporting member.

7. A magnetic head device according to claim 5, wherein said control conductive pattern includes a grounding pattern to which a ground terminal of said piezoelectric element is connected and a control signal pattern which is connected to a terminal other than the ground terminal of said piezoelectric element and which supplies a control signal.

8. A magnetic head device according to claim 1, wherein said elastic supporting member is made of a conductive material and is connected to a ground, and a ground terminal of said piezoelectric element is connected to the ground by said elastic supporting member.

9. A magnetic head device according to claim 1, wherein said control conductive pattern includes a grounding pattern to which a ground terminal of said piezoelectric element is connected and a control signal pattern which is connected to a terminal other than the ground terminal of said piezoelectric element and which supplies a control signal.

* * * * *

UNITED STATES PATENT AND TRADEMARK OFFICE
CERTIFICATE OF CORRECTION

PATENT NO.    : 6,707,645 B2
DATED         : March 16, 2004
INVENTOR(S)   : Masayoshi Nakagawa It is certified that error appears in the above-identified patent and that said Letters Patent is hereby corrected as shown below:

<u>Title page, Item [54] and Column 1, lines 2-3,</u>
Title, delete "WITH CONTROL CONDUCTIVE PATTERN"

Signed and Sealed this

Twentieth Day of July, 2004

JON W. DUDAS
*Acting Director of the United States Patent and Trademark Office*